United States Patent Office 3,202,680
Patented Aug. 24, 1965

3,202,680
NEW BENZENESULFONYL UREAS AND PROCESS FOR THEIR MANUFACTURE
Gerhard Korger, Frankfurt am Main, and Walter Aumüller, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed July 17, 1962, Ser. No. 210,579
Claims priority, application Germany, July 28, 1961, F 34,554
9 Claims. (Cl. 260—347.2)

The present invention relates to new benzenesulfonyl ureas of the formula

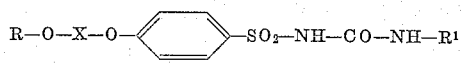

in which R represents a low alkyl group having from 1 to 6 carbon atoms, X represents an alkylene group having from 2 to 3 carbon atoms and $R^1$ stands for a saturated or unsaturated, aliphatic or alicyclic hydrocarbon radical having from 2 to 8 carbon atoms—in the case of cyclic compounds from 3 to 8 carbon atoms—whereby these radicals, if they contain from 3 to 8 carbon atoms, may be interrupted by an oxygen or sulfur atom; or $R^1$ represents a benzyl or β-phenyl-ethyl group and the salts thereof, which exhibit hypoglycemic properties and which because of their strong blood sugar reducing activity are suitable as oral antidiabetic drugs.

The present invention likewise relates to the preparation of said benzenesulfonyl ureas. For the manufacture of the new compounds those processes enter in consideration that are usually applied for the preparation of sulfonyl ureas.

Correspondingly substituted benzenesulfonyl isocyanates can be reacted, for example, with amines of the formula $R^1$—$NH_2$. Instead of these amines there may also be used the derivatives thereof, for example, amines which are formylated correspondingly, and the products thus obtained can be converted by hydrolysis into the desired products. The new benzenesulfonyl ureas may also be obtained in a reverse reaction, by reacting isocyanates of the formula $R^1$—NCO with correspondingly substituted benzenesulfonic acid amides, advantageously with the salts thereof. Instead of the benzenesulfonyl isocyanates as well as of the isocyanates of the formula $$R^1—NCO$$

there may generally be used also such compounds as in the course of the reaction form those isocyanates or as react like such isocyanates.

Benzenesulfonyl carbamic acid esters which are substituted correspondingly and which have a low molecular alkyl group or a phenyl radical in the ester component, and/or the corresponding benzenesulfonyl monothiocarbamic acid esters can be reacted with amines of the formula $R^1$—$NH_2$; or vice versa, carbamic acid esters of the formula $R^1$—NH—$COOR^2$, wherein $R^2$ represents a low molecular alkyl group or a phenyl radical, and/or monothiocarbamic acid esters can be reacted with correspondingly substituted benzenesulfonic acid amides.

Also carbamic halides can be used with the same success. The desired compounds can be obtained from correspondingly substituted benzenesulfonyl carbamic acid halides and amines of the formula $R^1$—$NH_2$, or vice versa, from carbamic acid halides of the formula

and correspondingly substituted benzenesulfonic acid amides.

Furthermore, benzenesulfonyl ureas, which are unsubstituted on the side of the urea molecule opposite to the sulfonyl group or which are substituted once or twice by other alkyl groups or aryl radicals, can be converted into the desired compounds by the reaction with amines of the formula $R^1$—$NH_2$, if desired in the form of the corresponding salts. Instead of the above-mentioned benzenesulfonyl ureas there may be used the corresponding N-benzenesulfonyl-N'-acyl ureas and/or also bis-(benzenesulfonyl)-ureas. Those bis-(benzenesulfonyl)-ureas or N-benzenesulfonyl-N'-acyl ureas can, for example, be treated with amines of the formula $R^1$—$NH_2$ and the salts thus obtained can be heated to temperatures above 100° C. It is, furthermore, possible to start from ureas of the formula $R^1$—NH—CO—$NH_2$, or from acylated ureas of the formula $R^1$—NH—CO—NH—acyl, wherein "acyl" represents a preferably low molecular aliphatic or aromatic acid radical or the nitro group, or from diphenyl ureas of the formula $R^1$—NH—CO—$N(C_6H_5)_2$ and to react said ureas with correspondingly substituted benzenesulfonic acid amides.

It is also possible to react basified urea derivatives, for example, guanidines, isourea ethers or salts of mono-$R^1$-substituted parabanic acids with tertiary amines, with correspondingly substituted benzenesulfonic acid halides and to convert the sulfonyl-isourea ethers and/or sulfonyl-parabanic acids so obtained by hydrolysis into the desired benzenesulfonyl ureas.

It is, furthermore, possible to prepare the correspondingly substituted benzenesulfonyl-thioureas and to exchange from these compounds the sulfur atom or the thiourea group in usual manner, against an oxygen atom, for example by means of oxides or salts of heavy metals, or by the use of oxidizing agents such as hydrogen peroxide, sodium peroxide and nitrous acid. The desired benzenesulfonyl ureas can finally be obtained by oxidizing the corresponding sulfenyl- and sulfinyl-ureas.

As starting substances for the process of the present invention there are used on the one hand such benzenesulfonic acid halides, amides, isocyanates, urethanes, ureas, isourea ethers, guanidines, thioureas, parabanic acid etc. as carry an alkoxy-alkoxy group in para position to the sulfonyl group, for example, β-methoxy-ethoxy, β-ethoxy-ethoxy, β-propoxy-ethoxy, β-N-butoxy-ethoxy, β-isobutoxy-ethoxy, β-amyloxy-ethoxy, β-hexyloxy-ethoxy, β-methoxy-propoxy, β-ethoy-propoxy, γ-methoxy-propoxy, γ-ethoxy-propoxy and the like.

For the preparation of p-alkoxy-alkoxy benzene sulfonic acid derivatives it is advantageous to start from the corresponding alkoxy-alkoxy benzenes and to react them in the melt according to known methods with amidosulfuric acid to p-alkoxy-alkoxy benzenesulfonic acid, from which the corresponding sulfonic acid halides can be obtained according to usual methods. From the sulfonic acid chlorides and/or halides further benzenesulfonic acid derivatives (such as, for example, carbamic acid esters, ureas, isourea ether etc.) serving—if desired—as starting substances, can be prepared according to known methods.

As reactants with the above mentioned sulfonyl compounds, amines of the formula $R^1$—$NH_2$ are used, for example ethylamine, n-propylamine, isopropylamine, butylamine-(1), butylamine-(2), 2-methyl-propylamine-(1), 2-methyl-propylamine-(2), pentylamine-(1), pentylamine-(2), pentylamine-(3), 3-methylbutylamine-(1), hexylamines such as hexylamine-(1) and 2-methyl-pentylamine-(1), heptylamines such as heptylamine-(1), heptylamine-(4), octylamines such as octylamine-(1). As alkenylamines there may further be mentioned, for example allylamine and crotylamine, as cycloalkylamines, cyclopentenylamine, cyclopentylamine, cyclohexylamine, cyclohexenylamine, cycloheptylamine, 4-methyl-cyclohexylamine and 2,5-endomethylene-cyclohexylamine, and as cycloalkylalkylamines cyclohexylmethylamine and cyclohexylethylamine. As aliphatic or cycloaliphatic compounds interrupted by an oxygen- or sulfur atom, there enter into consideration, for instance: 3-methoxy-propylamine, 3-ethoxy-propylamine, 4-methoxybutyl-amine, tetrahydro - α - furfurylamine, 3 - methyl-mercapto-propylamine and 3-ethylmercapto-propylamine. As aralkylamines be mentioned, for instance 2-phenyl-ethylamine-(1) and benzylamine. Instead of the aforementioned amines, the carbamic acid esters, carbamic acid halides, ureas, isourea ethers and parabanic acids prepared from said amines can be used for the reaction with suitable benzenesulfonyl compounds.

The forms of operation of the process according to the invention may, generally be varied to a large extent and adapted to the conditions of each individual case. The reactions may be carried out, for instance, while using solvents, at room temperature or at an elevated temperature. In order to obtain the products in a form as pure as possible, they are suitably completely separated from the benzene sulfamides used as starting substances or formed in the course of the reaction. This separation may be favorably effected by taking up the product according to the invention in considerably diluted ammonia, filtering off any undissolved matter and precipitating the desired N-(benzenesulfonyl)-urea by acidification.

The benzenesulfonyl ureas obtained according to the process of the present invention are valuable medicaments which, at a low toxicity, are characterized, in particular by a strong hypoglycemic action. For example, the N-[4-(β-methoxyethoxy)-benzenesulfonyl]-N'-cyclohexyl urea when tested in the form of the sodium salt on rabbits and applied in a dose of 400 mg./kg. of body weight administered per os effects a lowering of the blood sugar level by 40/ maximum. The same maximum lowering of the blood sugar on rabbits is obtained, when administering 400 mg./kg. of body weight of the sodium salt of N-[4-(β-methoxyethoxy)-benzenesulfonyl]-N'-isobutyl urea. The oral application of 400 mg./kg. of body weight of sodium salt of N-[4-(β-methoxyethoxy)-benzenesulfonyl]-N'-n-butyl urea on rabbits effects a lowering of the blood sugar level by 50% maximum.

Since they do not contain an amino group in para-position in the benzene nucleus, the products of the invention do not show an action which could be compared with that of sulpha drugs (which are used therapeutically with infectious diseases), so that they do not cause a development of resistance even when applied for years. For the same reason there do not occur any side effects which result in injuries of the intestinal flore.

The products of the invention are preferably used for the production of preparations to be orally administered in the treatment of diabetes mellitus and showing hypoglycemic action. They can be used as such or in the form of their salts or of substances that cause salt formation. For the salt formation may be used, e.g. alkaline agents such as alkali metal or alkaline earth metal hydroxides, carbonates or bicarbonates, furthermore, physiologically compatible organic bases. As medical preparations there enter into consideration preferably tablets containing in addition to the products of the invention the usual adjuvants and carriers, such as talc, starch, lactose, tragacanth, magnesium stearate and the like.

The following examples serve to illustrate the invention but they are not intended to limit it thereto:

EXAMPLE 1

N-[4-(β-methoxy-ethoxy)-benzenesulfonyl]-N'-cyclohexyl urea 16.2 grams of 4-(β-methoxyethoxy)-benzenesulfonamide are dissolved in 200 cc. of acetone and after addition of 19.5 grams of ground potassium carbonate are heated at the boil for one hour. 10 grams of cyclohexylisocyanate are then added thereto, and the mixture is stirred at 56° C. for a further 20 hours. The potassium salt thus formed is filtered with suction, dissolved in 800 cc. of water, the solution is filtered, clarified with charcoal, and the filtrate is acidified with hydrochloric acid. The separated precipitate is filtered with suction, washed with water and recrystallized from 200 cc. of methanol. There are obtained 19.1 grams of N-[4-(β-methoxy-ethoxy)-benzenesulfonyl]-N'-cyclohexyl urea melting at 155–157° C. The 4-(β-methoxy-ethoxy)-benzenesulfonamide serving as starting substance, can for example, be prepared as follows:

425 grams of β-methoxy-ethoxy benzene are heated at 180° C., and while stirring, 500 grams of finely ground amidosulfonic acid are added thereto. Thereby the temperature rises to 215° C. The mixture thus formed is stirred for a further 2½ hours at 185–200° C. and the solid substance obtained after cooling is dissolved by the introduction of steam. The aqueous solution is clarified with charcoal, and potassium chloride is added in the heat to the filtrate until it is saturated. After cooling at 5° C., the potassium salt of the 4-(β-methoxyethoxy)-benzene-sulfonic acid is filtered with suction, dried and pulverized finely. The yield amounts to 600 grams.

600 grams of potassium salt and 275 grams of phosphorus pentachloride are mixed in portions while being stirred, whereby liquefaction occurs with the rising temperature. The mixture thus formed is heated for a further 2 hours on the steam bath and then poured on ice. The oil that has precipitated in said process is taken up in ether, the ether solution is shaken out three times with water and the ether is distilled off. 380 grams of 4-(β-methoxyethoxy)-benzenesulfonic acid chloride are obtained.

300 grams of the acid chloride obtained are heated for three hours on the steam bath wtih 1 liter of concentrated ammonia. After cooling, the whole is acidified with concentrated hydrochloric acid, the separated precipitate is filtered with suction, dissolved in 2n-sodium hydroxide solution, the solution is filtered with suction through a layer of coal and the filtrate is acidified again. After filtering with suction, washing with water and drying, there are obtained 200 grams of 4-(β-methoxyethoxy)-benzenesulfonamide melting at 154–156° C. After recrystallization from water the melting point is 159–161° C.

EXAMPLE 2

N-[4-(β-methoxyethoxy)-benzenesulfonyl]-N'-cyclooctyl urea 26 grams of N-[4-(β-methoxyethoxy)-benzenesulfonyl]-carbamic acid ester [prepared by the reaction of 4-(β-methoxyethoxy)-benzenesulfonamide with chloroformic acid methyl ester in the presence of acetone and ground potassium carbonate] are mixed with 10.2 grams of cyclooctylamine and heated for 1 hour at 130° C. The melt thus formed is treated with 4 liters of dilute ammonia (1:25), the solution is filtered and the filtrate is acidified with hydrochloric acid. The precipitate is filtered with suction, washed with water and recrystallized twice from methanol. Thus, there is obtained the N-[4-(β-methoxyethoxy)-benzenesulfonyl]-N'-cyclooctyl urea melting at 154–156° C.

When reacting 26 grams of N-[4-(β-methoxylethoxy)-benzenesulfonyl]-carbamic acid methyl ester and 5.9 grams of n-propylamine there are obtained in analogous manner 21 grams of N-[4-(β-methoxyethoxy)-benzenesulfonyl]-N'-n-propyl urea melting at 123–125° C. after recrystallization from methanol.

When using α-tetrahydrofurfurylamine there is obtained in the same manner the N-[4-(β-methoxyethoxy)-benzenesulfonyl]-N'-α-tetrahydrofurfuryl urea melting at 110–113° C. (from methanol).

EXAMPLE 3

N-[4-(β-methoxyethoxy)-benzenesulfonyl]-N'-n-hexyl urea 24 grams of 4-(β-methoxyethoxy)-benzenesulfonamide are reacted and worked up according to the direction given in Example 1 with 12.7 grams of n-hexylisocyanate in 250 cc. of acetone and in the presence of 20 grams of ground potassium carbonate. There are obtained 20 grams of N-[4-(β-methoxyethoxy)-benzenesulfonyl]-N'-n-hexyl urea melting at 113–115° C. (from methanol).

With the use of n-butylisocyanate there is obtained in analogous manner the N-[4-(β-methoxyethoxy)-benzenesulfonyl]-N'-n-butyl area melting at 116–118° C., and with the use of isobutylisocyanate there is obtained the N-[4-(β-methoxyethoxy)-benzenesulfonyl]-N-'isobutyl urea melting at 119–121° C.

EXAMPLE 4

N-[4-(β-methoxyethoxy)-benzenesulfonyl]-N'cycloheptyl urea 20 grams of N-[4-(β-methoxyethoxy)-benzenesulfonyl)-N'-cyclo-heptyl thiourea [prepared by the reaction of 4-(β-methoxyethoxy)-benzenesulfonamide with cycloheptyl mustard oil in the presence of acetone and ground potassium carbonate melting at 119–121° C. from methanol] are dissolved in acetone. The solution is cooled at +5° C. and mixed successively with a solution of 4.2 grams of sodium nitrite in 5 cc. of water and 32 cc. of 5-n-acetic acid, while being stirred. After stirring for 2 hours, the larger part of acetone is distilled off under reduced pressure, the residue is liberated by filtration from the elementary sulfur formed during the reaction, and the filtrate is mixed with water. The precipitated product is separated, washed with water and recrystallized from methanol. The N-[4-(β-methoxyethoxy)-benzene sulfonyl]-N'-cyclo-heptyl urea so obtained melts at 153–156° C.

EXAMPLE 5

N-[4-(β-ethoxyethoxy)-benzenesulfonyl]-N'-cyclohexyl urea 15 grams of 4-(β-ethoxyethoxy)-benzensulfonamide [prepared according to Example 1 with the use of β-ethoxyethoxy benzene as starting material; melting point of the amide 125–127° C.] and 7.6 grams of cyclohexyl isocyanate are reacted — according to the direction given in Example 1 — in 200 cc. of acetone and in the presence of 16.5 grams of ground potassium carbonate. The product thus obtained is recrystallized from aqueous methanol. The N-[4-(β-ethoxyethoxy)-benzenesulfonyl)-N'-cyclohexyl urea so obtained melts at 148–151° C. (from aqueous methanol).

We claim:

1. Compounds of the group consisting of (1) benzene sulfonyl ureas of the formula

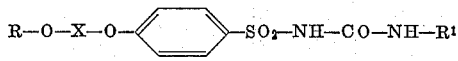

wherein R represents alkyl of at most 4 carbon atoms, X represents alkylene of 2 to 3 carbon atoms and R¹ is a member selected from the group consisting of alkyl of 2 to 8 carbon atoms, alkenyl of 2 to 8 carbon atoms, cycloalkyl of 3 to 8 carbon atoms, cycloalkyl of at most 8 carbon atoms, methoxy-propyl, ethoxy-propyl, methoxy-butyl, methylmercapto-propyl, ethyl-mercapto-propyl, tetrahydro-αfurfuryl, benzyl and phenyl ethyl, and (2) pharmaceutically acceptable basic salts thereof.

2. The compound of the formula

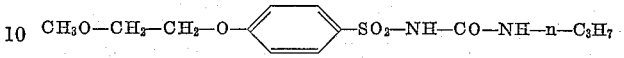

3. The compound of the formula

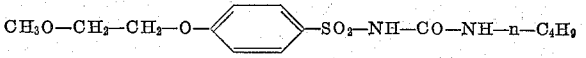

4. The compound of the formula

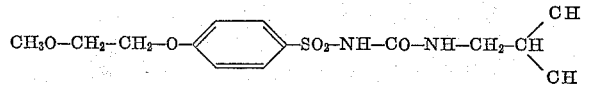

5. The compound of the formula

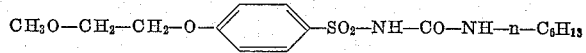

6. The compound of the formula

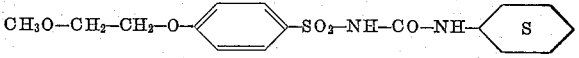

7. The compound of the formula

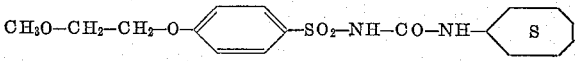

8. The compound of the formula

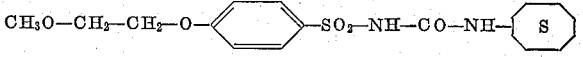

9. The compound of the formula

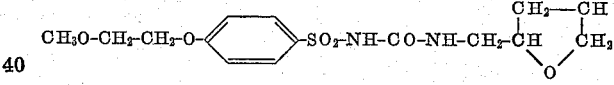

References Cited by the Examiner

UNITED STATES PATENTS

| | | | |
|---|---|---|---|
| 2,953,578 | 9/60 | Haack et al. | 260—553 |
| 2,968,158 | 1/61 | Ruschig et al. | 260—553 |
| 2,974,156 | 3/61 | Aeschlimann | 260—553 |
| 3,004,889 | 10/61 | Kuna et al. | 167—65 |
| 3,005,022 | 10/61 | McLamore et al. | 260—553 |
| 3,024,166 | 3/62 | Kuna et al. | 167—65 |

FOREIGN PATENTS 919,464  11/46  France.

OTHER REFERENCES

Blank et al.: J. Org. Chem., vol. 26, pp. 1551–1553 (1961).

Haack: Arzn. Forsch., vol. 8, pp. 444–448 (1958).

WALTER A. MODANCE, *Primary Examiner.*

IRVING MARCUS, NICHOLAS RIZZO, JOHN. D. RANDOLPH, *Examiners.*